United States Patent [19]
Abdelmalek

[11] Patent Number: 5,321,946
[45] Date of Patent: Jun. 21, 1994

[54] METHOD AND SYSTEM FOR A CONDENSING BOILER AND FLUE GAS CLEANING BY COOLING AND LIQUEFACTION

[76] Inventor: Fawzy T. Abdelmalek, 12807 Willowyck Dr., St. Louis, Mo. 63146

[21] Appl. No.: 977,138

[22] Filed: Nov. 16, 1992

Related U.S. Application Data

[63] Continuation-in-part of Ser. No. 754,305, Sep. 4, 1991, Pat. No. 5,133,190, and a continuation-in-part of Ser. No. 645,804, Jan. 25, 1991, Pat. No. 5,146,755.

[51] Int. Cl.⁵ .............................................. F01K 25/14
[52] U.S. Cl. ...................................... 60/648; 60/650; 165/913
[58] Field of Search ...................... 60/648, 650, 682; 165/909, 913, 921

[56] References Cited

U.S. PATENT DOCUMENTS

| | | | |
|---|---|---|---|
| 4,347,704 | 9/1982 | Marquardt | 60/648 |
| 4,416,325 | 11/1983 | Barratt et al. | 165/909 |
| 4,513,573 | 4/1985 | Funk | 60/648 |
| 4,971,142 | 11/1990 | Mergler | 165/913 |
| 4,977,745 | 12/1980 | Heichberger | 60/648 |
| 5,001,902 | 3/1991 | Garbo | 60/648 |
| 5,133,190 | 7/1992 | Abdelmalek | 60/648 |
| 5,146,755 | 9/1992 | Abdelmalek | 60/655 |
| 5,233,837 | 8/1993 | Callahan | 60/648 |

Primary Examiner—Edward K. Look
Assistant Examiner—Mark Sgantzos
Attorney, Agent, or Firm—Peoples, Hale & Coleman

[57] ABSTRACT

A method for cleaning a flue gas stream continuously emitting from a thermal power plant fossil fueled boiler, and containing hazardous volatile organic vapors, heavy metal vapors, nitrogen oxides, sulfur dioxide, and carbon dioxide by cooling, condensing and gas liquefaction processes employing a heat recovery condensing heat exchanging, and a gas compressor-expander open heat cycle systems.

9 Claims, 3 Drawing Sheets

METHOD AND SYSTEM FOR A CONDENSING BOILER AND FLUE GAS CLEANING BY COOLING AND LIQUEFACTION

RELATIONSHIP TO OTHER PATENT APPLICATIONS

This application constitutes a continuation in-part of my U.S. patent applications 754,305, filed Sep. 4, 1991, now U.S. Pat. No. 5,133,190 and 645,804, filed Jan. 25, 1991, now U.S. Pat. No. 5,146,755.

BACKGROUND OF THE INVENTION

1. Field of the Invention

The present invention is a continuation in part of my U.S. Pat. Nos. 5,146,755 and 5,133,190 which disclosed methods for clean-up of a boiler flue gas stream by cooling and condensing its acidic water vapor, and for separation and liquefaction of sulfur dioxide and carbon dioxide gases. More particularly, it relates to an improved method for cooling and condensing the flue gases, while preheating the boiler combustion air by employing a heat pipe heat exchanger, and a method for liquefying, and removing the pollutant gas products at lower pressure and temperature ranges, by employing a gas compressor-expander in an open heat cycle system.

2. Description of the Prior Art

In my U.S. Pat. No. 5,146,755, I disclosed a method for flue gas cleaning system employing a power co-generation system, to conserve energy, and provide cooling for the hot flue gas stream and condensing its acidic water vapor. In my U.S. Pat. No. 5,133,190 I disclosed another system for separating the cooled flue gas stream into a lighter gas fraction enriched with nitrogen, and a heavier gas fraction enriched with carbon dioxide and sulfur dioxide gas components. The lighter gas fraction is diffused in a cooling tower system to dissolve any trace nitrogen oxides and sulfur dioxide emitted in the lighter gas fraction, and to uplift and disburse the gases into the atmosphere. The sulfur dioxide, and as desired part of the carbon dioxide are liquified by compression and cooling processes. The relatively high pressure of the uncondensed gases is reduced to allow venting into the atmosphere.

One embodiment of the present invention provides an improved method employing a heat pipe heat exchanger to recover the low temperature heat energy rejected in the flue gas stream to preheat the combustion air stream, while cooling and condensing its acidic water vapor. The system which herein is referred to the condensing boiler systems will achieve a substantially higher thermal efficiency, and will recover wasted energy recovered to preheat the combustion air, and will result in reducing the heat rate of the steam power plant. This is contrast to a separate low temperature co-generation electric power system employing an ammonia driven power cycle which operates at much lower thermal cycle efficiency, when compared with the utility high pressure steam power cycle.

In the past, gas fired high efficiency condensing furnaces are used for residential and commercial space heating systems. In a residential or commercial condensing furnace, the flue gas stream is cooled, and its water vapor is condensed by exchanging its sensible and latent heat with the recirculating room air stream. The present invention provides a high efficiency condensing boiler system employing a reversible heat pipe heat exchanger. In the heat pipe heat exchanger structure the flue gas stream is cooled and its water vapor is condensed by exchanging its sensible and latent heat with a combustion air stream flowing in a reverse direction.

Another embodiment of the present invention overcomes the high power requirements for the liquefaction of the sulfur dioxide, and carbon dioxide, and provides novel means for condensing the sulfur dioxide, and the carbon dioxide while recovering wasted energy, thereby providing an energy-efficient system by employing a gas compressor-expander in an open heat cycle system, First; to condense its acidic water vapor containing dissolved nitrogen oxides and other volatile organic vapors, and Second; to liquefy most of the sulfur dioxide and carbon dioxide contained therein at much lower temperatures utilizing the cryogenic effect from the gas expansion. This is contrast to the gas liquefaction by compression and cooling using water and auxiliary refrigeration system, for which higher pressures are needed to achieve the thermodynamic equilibrium temperatures, not making advantage of the wasted heat energy released with the uncondensed clean gas stream.

An open heat cycle system is employed for liquefaction process, where a gas compressor-expander acts upon the heavier gas fraction flowing from the gas separation step, to change its pressure, and temperature to reach a thermodynamic equilibrium point corresponding to condensing a gas component. In the course of this process, and in the presence of excess oxygen; the trace nitrogen oxide content in the flue gas is subjected to a dramatic accelerated oxidation, and reacts immediately in the water vapor condensate to form weak nitric acid.

The type of the gas compressor-expander will depend upon the desired operating pressures and temperatures. The gas compressor-expander unit may be of centrifugal or axial flow, single or multi-stage, and its drive may be electric motor, or steam turbine. The cryogenic effect produced by the gas expander is regulated by controlling the pressure ratio across the expander. Raising the gas compressor discharge pressure increases the pressure ratio, and provides more refrigeration effect needed for the liquefaction of the carbon dioxide. The working pressure and temperature range must be controlled to prevent forming solids or icing of carbon dioxide at or near the gas subliming equilibrium point.

Pressure ratio of up to 3:1 with the range of 2:1 to 2.5:1 will be preferred for liquefaction of the sulfur dioxide, and pressure ratio of up to 20:1 with the range of 10:1 to 15:1 will be preferred for liquefaction of the carbon dioxide.

In the past, open air heat cycles in different arrangements have been used for many years for environmental control and liquefaction of gases in many industrial applications including oil refinery, nitric acid manufacturing, and air liquefaction processes. U.S. Pat. No. 4,923,492 disclosed a system for removing hydrocarbons or chemical vapors; U.S. Pat. No. 4,696,689 disclosed a system for separating product gas from raw gas; however, in so far as is known, the invention described herein is first to employ a compressor-expander open heat cycle system to clean flue gases, by cooling and condensing its nitrogen oxides, sulfur dioxide, carbon dioxide and other organic gas compounds emitted from the fossil fuel fired boilers power plants.

SUMMARY OF THE INVENTION

Figure 1:
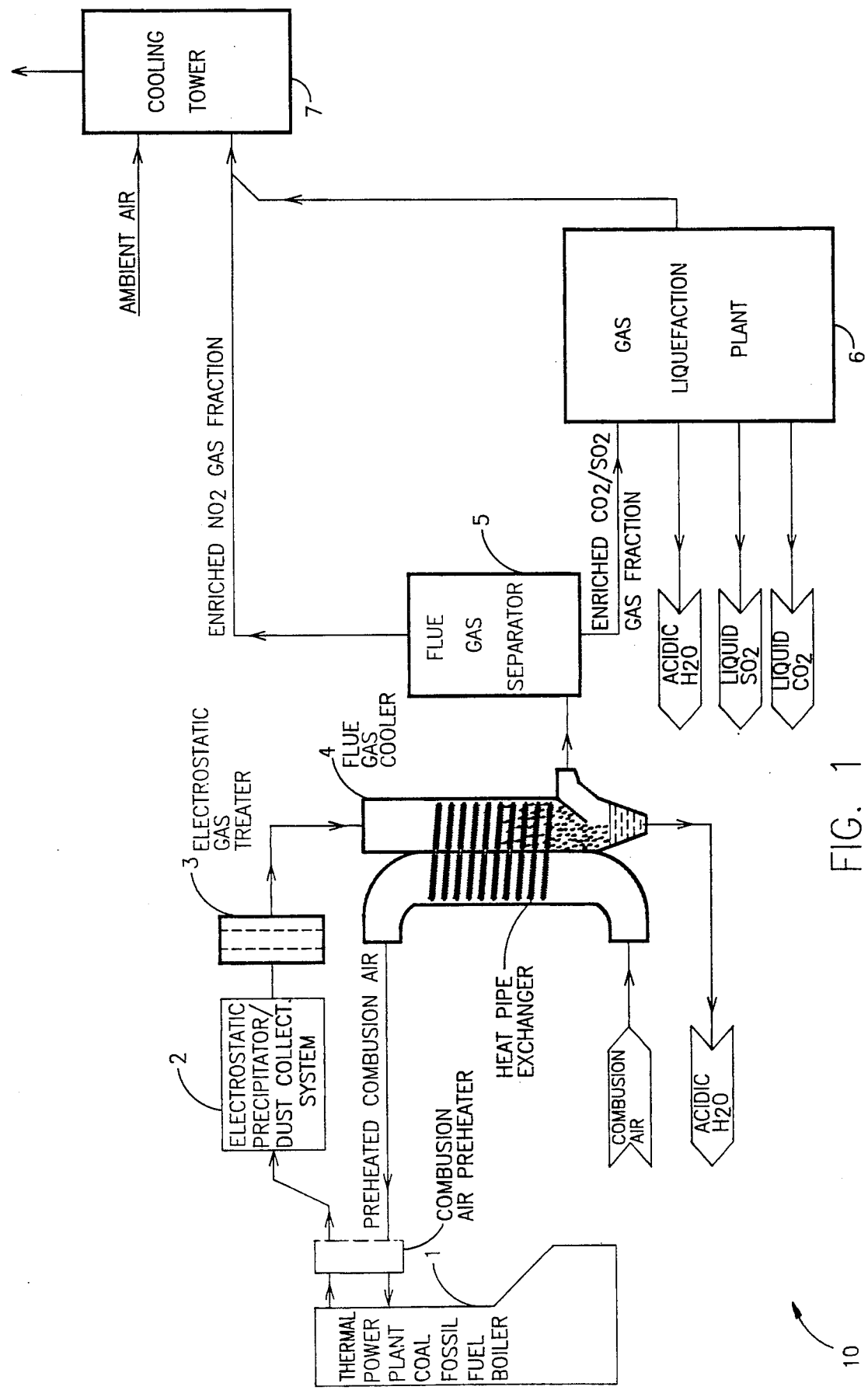
FIG. 1—Is a schematic block diagram for condensing boiler and flue gas cleaning system.

It is therefore a principle object of the present invention to provide an improved flue gas cleaning system by cooling and liquefaction of gases to remove its condensable vapors, and liquefy its sulfur dioxide and carbon dioxide, which is economical to install and operate.

It is further a principle object of the present invention to provide a condensing boiler system by employing a heat pipe heat exchanger to cool and condense the vapors of the boiler flue gases while recovering its sensible and latent heat to preheat the boiler combustion air.

It is also a principle object of the present invention to employ a gas compressor-expander and heat exchange system to reduce the energy needed to liquefy the nitrogen oxides, sulfur dioxide, carbon dioxide and other condensable gas pollutants emitted in the boiler flue gases.

It is further an object of the present invention to separate the sulfur dioxide, carbon dioxide, and other volatile organic matter, at relatively low pressure and temperature levels, to reduce the cost of the boiler flue gas clean-up system, and to produce useful liquefied gas by-products.

It is further an object of the present invention to conserve energy, improve the efficiency, and reduce the heat rate to generate power from fossil fuel power plants.

The above, and other objects and advantages of the present invention will become apparent from the following specifications, drawings and claims. It will be understood that particular embodiments of the invention are shown by way of illustration only, and not as limitation of the invention. The principle features of this invention, may be employed in various embodiments without departure from the scope of the invention.

DETAILED DESCRIPTION OF THE PRESENT INVENTION

Emissions of the nitrogen oxides ($NO_x$), sulfur dioxide ($SO_2$), carbon dioxide ($CO_2$) and other volatile organic compounds (VOCs) from power plants and industrial boilers, are regulated by the Clean Air Act (CAA). Although sulfur dioxide ($SO_2$) emissions are the primary focus of acid rain control methods, nitrogen oxides ($NO_x$), and volatile organic compounds (VOCs) have much greater effect to form acid rain and ozone in the atmosphere, and became more stringently regulated under the Clean Air Amendments (CAAA).

Wet or dry flue gas scrubbing systems are proven for reduction, they require massive and very expensive equipment for handling and processing the raw materials and for the disposal of the solid wastes. Wet scrubbers are not effective in removing the nitrogen oxides due to its very low solubility in alkaline solutions, and they do not eliminate the acid mist carried over with the scrubber exhaust. These reasons, besides inefficient, cumbersome, unduly expensive process are the stumbling block for these systems to continue dominating the flue gas cleaning market.

The present invention provides an improved method for power plant energy recovery and for cleaning the boiler flue gas by cooling, and condensing the acidic water vapors, and by liquefying the nitrogen oxides, sulfur dioxide and carbon dioxide gases. First; by recovering the waste energy of the hot flue gases to preheat the combustion air while cooling the flue gas to produce acid rain in equipment. This first step will remove the majority of the flyash fine particulate matter, and trace heavy metals species, which will end up in the waste water stream for proper treatment and disposal. Second; by increasing the pressure and reducing the temperatures of the flue gas to liquefy its gas components. $NO_x$, $SO_2$ and $CO_2$ are condensed and can be removed at selected thermodynamic equilibrium points in the liquefaction process. Third; by diffusing the cooled flue gases in a cooling tower gas release system, the recirculating cooling water will further remove any $NO_x$ and $SO_2$ remaining in the released flue gas stream.

Nitrogen oxides ($NO_x$) is formed in two ways. First, it results from the combustion process (thermal $NO_x$), and is influenced by the burning temperatures, at high combustion temperatures nitrogen and oxygen disassociate and form $NO_x$. The second form of $NO_x$ generation is a function of the amount of nitrogen resident in the fuel being burned (Fuel $NO_x$), natural gas has little fuel nitrogen, while oil and coal contain significantly more. Reduction of $NO_x$ emissions by the use of clean fuels, staged combustion process, flue gas recirculation, selective non-catalytic reduction, and selective catalytic reduction are all alternative methods and technologies known for $NO_x$ reduction; each of these methods has proved to be very expensive, and has its own limitations on the $NO_x$ reduction rate. Reduced boiler plant efficiency, increased particulate matter, and increased carbon monoxide and dioxide emissions, are few of the known limitations of these technologies.

The present invention reduces $NO_x$ by cooling the flue gases, and condensing its water vapors at selected pressure levels throughout the process. It is well known that the manufacturing of nitric acid ($HNO_3$) requires oxidation of ammonia ($NH_3$) by oxygen ($O_2$) in a catalytic reactor at elevated temperatures; this process produces nitric oxide (NO) which is then cooled, oxidized to nitrogen dioxide ($NO_2$), and absorbed in water to form nitric acid. The present invention provides a method to form diluted nitric acid by cooling the flue gases to accelerate oxidation of its nitric oxide (NO), which when combined with the excess oxygen in the flue gases forms nitrogen dioxide as follows:

$$2NO + O_2 \rightarrow 2NO_2$$

$NO_2$ is a reddish gas which liquefies at 72.3° F. when saturated at atmospheric pressure. At lower temperatures; $NO_2$ becomes very soluble in water and reacts to form nitric acid ($HNO_3$), and nitric oxide (NO) as follows:

$$2NO_2 + H_2O \rightarrow 2HNO_3 + NO$$

The nitric oxide is then oxidized to nitrogen dioxide, and recycled; the total reaction under this circumstance is:

$$4NO + 3O_2 + 2H_2O \rightarrow 4HNO_3$$

At lower temperatures almost all the nitric oxide which enters the liquefaction plant, is subjected to accelerated oxidation by increasing its pressure and reducing its temperature; under the same circumstance, part of the sulfur dioxide ($SO_2$) forms aquous sulfide ion ($SO_3$) which is very soluble in water to react and form sulfurous acid ($HSO_3$) as follows:

$$SO_2+H_2O \rightarrow HSO_3+H^+$$

diluted aquous solution of sulfurous acid and nitric acid react to form diluted sulfuric acid as follows:

$$HSO_3+HNO_3 \rightarrow HSO_4+H_2O+NO$$

In the presence of excess oxygen ($O_2$), nitric oxide (NO) is oxidized to nitrogen dioxide ($NO_2$) and recycled. In a typical mass flow of a boiler flue gas stream containing 6000 ppm (wt.) $SO_2$, 500 ppm (wt.) NO, 3.5% $O_2$, 5.9% $H_2O$ and 1000 ppm (wt.) flyash and trace heavy metals, the cooling process will cause the (NO) to be oxidized and dissolved in water to form weak nitric acid, this process will be accelerated by the steps of compression and cooling. Most of the ($SO_2$) will be liquefied and removed as liquid $SO_2$ by-product. Most of the flyash trace heavy metals species will end in the acidic water vapor condensate to react and form sulfate, and nitrate compounds. In conclusion, when the flue gas is cooled its nitric oxide is oxidized and dissolved in water to form weak nitric acid, and part of the sulfur dioxide forms sulfurous acid, and in the presence of trace heavy metal species, concurrent and consecutive reactions will take place and will result in forming dilute sulfuric acid, and metal sulfate compounds which will end up in the waste water stream, and can be treated and properly disposed.

In the present invention the flue gases are cooled, and most of its acidic water is condensed by exchanging its sensible and latent heat to preheat the combustion air stream employing a heat pipe heat exchanger. Heat pipe heat exchangers are well known, and are widely used as recuperators in heating and ventilating systems, in power plants, and in variety of industry heat recovery applications. The advantages of the heat pipe exchangers include high effectiveness, compactness, no moving parts, and complete separation between the hot and cold gas streams. The type and thermodynamic characteristics of the working fluids will vary with the application and the temperature range. In this application water is a preferred fluid for temperatures between 150° F. and 500° F., ammonia is a preferred working fluid for relatively lower temperatures between 0° F. and 200° F., and a variety of cryogenic fluids may be used for low temperature ranges needed for flue gas liquefaction heat exchangers. A heat pipe acts like a high conductance heat conductor with a high heat transfer rate, and a small temperature gradient. The heat transfer capability is a function of the fluid thermodynamic property, the pipe material, cross sectional geometry, and the wick design.

Liquefaction of the sulfur dioxide will occur at temperatures below −40° F., and at $SO_2$ partial pressure above 1.2 psia, which will require a system pressure above 30 psia. Liquefaction of the carbon dioxide will occur at temperatures below −60° F. and at $CO_2$ partial pressure above 92 psia, which will require a system pressure above 200 psia. The minimum system pressure and the amount of carbon dioxide liquefied, must be controlled to maintain the $CO_2$ partial pressure above its subliming point to avoid forming solids or dry ice in the gas expander.

The cryogenic effect of the uncondensed gases, and of the refrigeration effect of the liquefied by-products are utilized to provide the cooling required for condensing the gas components.

OPERATION

FIG. 1 indicates a schematic block diagram for a flue gas cleaning system 10. The flue gases flowing from a boiler, incinerator or other fossil fuel burning facility 1, is received after removing its particulate matter in an electrostatic precipitator, or a dust collector 2, and conducted to enter an electrostatic gas treater 3, where the electromagnetic charges of its ultra-fine submicrone particulate matter is neutralized to enhance coagulation of the particles, and prevent its adherence to the metallic surfaces of the heat exchanger elements. The treated gas enters the gas cooler 4, where its temperature is reduced to near or below the ambient temperature to accelerate the oxidation process of the nitric oxide (NO), which when cooled, reacts with the excess oxygen ($O_2$) and forms nitrogen dioxide ($NO_2$). At low temperatures, nitrogen dioxide reacts readily with the water vapor to form weak nitric acid ($HNO_3$), under the same circumstances, small part of the sulfur dioxide form sulfurous ion ($SO_3$), which dissolves in water to form sulfurous acid ($HSO_3$), and together in the presence of trace heavy metal species, they react to form sulfates diluted sulfuric acid ($H_2SO_4$) and metal sulfates, and they end up in the acidic water stream, which can be contained, removed, treated and recirculated in the cooling tower system. The flue gas cooler 4 is a flue gas to air heat pipe heat exchanger, where the relatively hot flue gas stream flowing through one side of the heat exchanger at above 270° F. is cooled to approach the ambient temperature, while the combustion air stream flowing through the other side of the heat exchanger at ambient temperature is heated to approach the incoming hot flue gas stream temperature; depending upon the ambient temperature approximately 60 to 70% of the water vapor contained in the flue gas stream will condense. The heat recovered by the combustion air will contribute to approximately 8 to 9% reduction in the heat rate of the power plant heat cycle. Condensation of the vapors contained in the relatively higher temperature flue gas stream will occur on the metal surfaces of the heat exchanger at temperatures below the dew point of the condensing vapor, even at gas temperatures higher than the vapor dew point, condensation will occur at the relatively colder metal surface of the heat exchanger. The heat pipe heat exchanger can be divided into three temperature condensing zones; a high temperature zone where the condensing temperature is above 200° F.; a medium temperature zone where the condensing temperature is above 100° F. and below 200° F.; and a low temperature zone where the condensing temperature is below 100° F. More condensation will occur at lower temperatures in the medium and low temperature zones. The lower the temperature of the heat exchanger surface, the more condensate washing, and the lesser the corrosion effect will be. The higher the condensing temperature (above 200° F.), the more aggressive corrosion environment will occur. The heat exchanger elements must be constructed from suitable high corrosion resistant materials, and must be protected by intermittent wash cycles, using high pressure water or steam spray nozzle system to keep the heat exchanger surfaces clean and effectively reduces the corrosion, and increases the life cycle of the heat exchanger. The interior of the flue gas cooler enclosure may be protected with corrosion resistant coating or constructed from corrosion resistant materials. The cooled flue gases flowing from the gas cooler enters the flue gas separator 5, where the gases are separated into two gas streams; a heavier gas fraction, basically an enriched carbon dioxide mixture of gases, contains most of the sulfur dioxide and nitrogen oxides. The mass flow of the heavier gas fraction stream may account to between 6 and 25% of the flue gas emitted from the boiler and may consist of 35% to 45% carbon dioxide, 2% to 5% sulfur dioxide, 2% to 3% oxygen, 50% to 55% nitrogen and other traces of flue gas components. The enriched heavier gas fraction enters the gas liquefaction plant 6, where the gas is acted upon by compression, cooling, and expansion to generate useful power and cryogenic effect needed for condensing its acidic water vapor, sulfur dioxide, and carbon dioxide, each at its corresponding equilibrium partial pressure in the gas mixture. The refrigeration effect of the uncondensed gas stream, and the liquefied gas by-products are further used to provide the cooling required for the process. The reheated uncondensed gases are combined with the lighter gas fraction flowing from the gas separator, and are vented in the cooling tower gas release system 7. The high mass flow rate of the recirculating cooling tower water, and the oxygen rich ambient air in the cooling tower system will permit dissolving most of the nitrogen oxides released from the different steps of the process. The cleaned flue gas stream will be mixed with the ambient air and uplifted by the cooling tower strong draft for an unembedded disbursement in the atmosphere.

Figure 2:
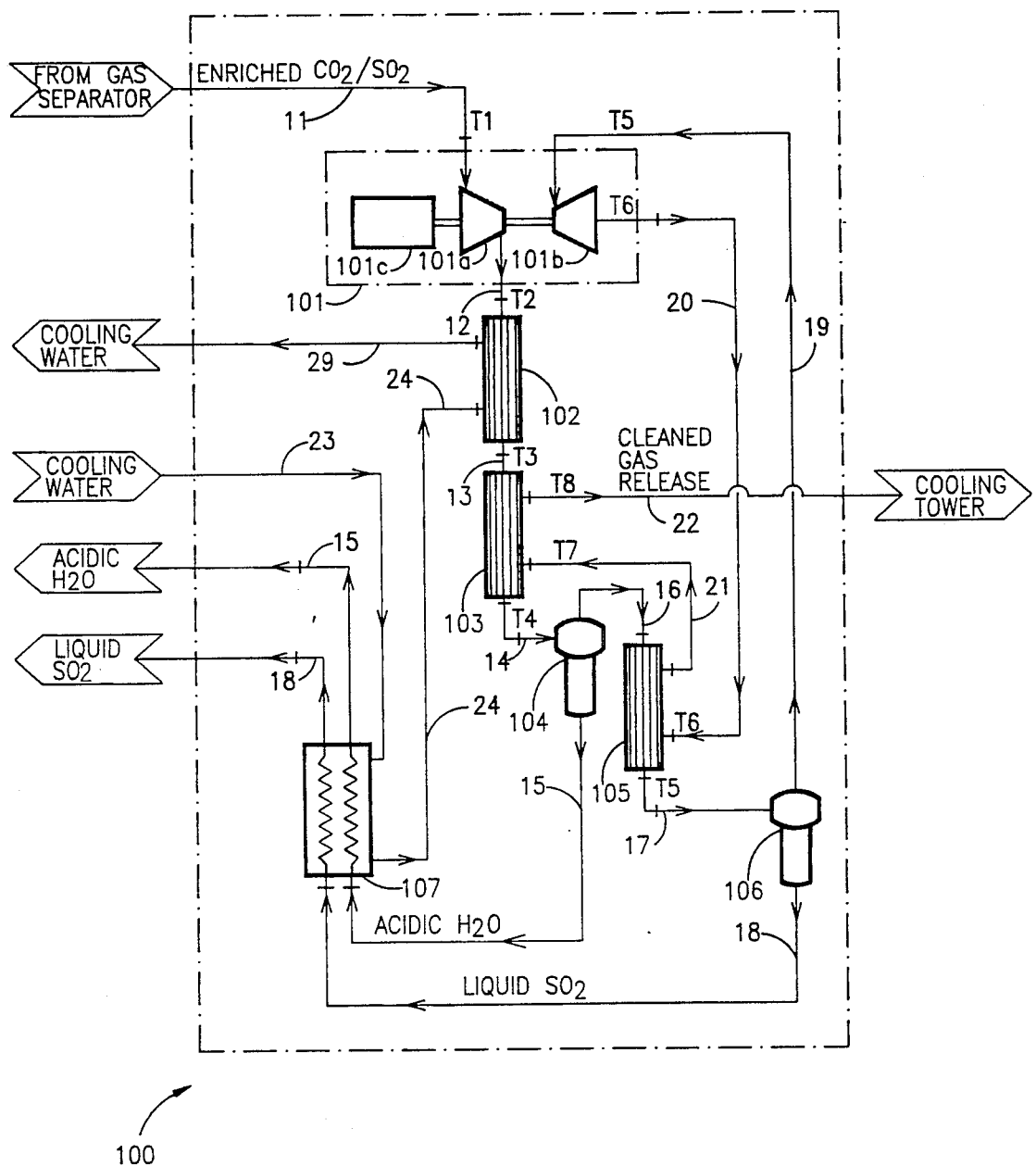
FIG. 2—Is a schematic diagram for a low pressure flue gas desulfurization system by liquefaction of sulfur dioxide.

FIG. 2 indicates a schematic diagram for system 100 for the flue gas desulfurization by liquefaction of sulfur dioxide, employing a gas compressor-expander unit 101. The unit 101 consists of a gas compressor 101a, connected to a gas expander 101b, and driven by an electric motor or steam turbine prime mover 101c. The heavier gas fraction flowing from the gas separator enters the gas compressor 101a. The gas compressor 101a has a pressure ratio of up to 3:1 with range between 2:1 to 2.5:1 will be preferred depending upon the concentration of the sulfur dioxide ($SO_2$), and nitrogen oxides ($NO_x$) in the heavier gas fraction entering the gas liquefaction system. The heavier gas fraction flowing from the gas separator at near atmospheric pressure of 14.7 psia. (P1), and ambient temperature of about 85° F. (T1), passes through line 11 to enter the gas compressor 101a, where the gas is compressed to a higher pressure level of about 30 psia (P2), and 180° F. (T2). The pressurized hot gas passes through line 12 to a first heat exchanger (after cooler) 102 to reduce its temperature to below 85° F. (T3) using auxiliary cooling water circuit. The flue gas flowing from the after cooler heat exchanger 102 is then conducted through line 13 to a second heat exchanger 103, where its temperature is reduced to below 40° F. (T4) to condense most of its water vapors, and to accelerate the oxidation of most of the nitric oxide to form nitrogen dioxide which reacts readily with the water vapor condensate forming weak nitric acid. The pressurized gases, and the acidic water vapor condensate then passes through line 14 to a first moisture separator 104. In the moisture separator 104 the acidic water condensate is separated and removed from the bottom through line 15 and the gases are released from the top through line 16. The cleaned pressurized gas stream then enters a third heat exchanger 105 to further reduce its temperature to below −60° F. (T5) to condense most of the sulfur dioxide in the gas mixture. The desulfurized gas, and the sulfur dioxide condensate then passes through line 17 to a second moisture separator 106. In the moisture separator 106, the liquid sulfur dioxide is separated, and removed from the bottom through line 18, and the uncondensed gas stream is released from the top through line 19. The pressurized uncondensed gas stream is then conducted through the gas expander 101b, where the gas expands isentropically to a relatively lower pressure, and its temperature drops substantially to a much lower temperatures below −100° F. (T6). The gases flowing from the expander passes through line 20 to enter the said third heat exchanger 105 to provide cooling needed for condensing the sulfur dioxide, while increasing its temperature to about 0° F. (T7). The gas from the third heat exchanger 105 then passes through line 21 to enter the said second heat exchanger 103, to further provide cooling needed for condensing the acidic water vapor, while reheating the uncondensed gas back to near ambient temperature (T8). The expanded, cleaned and reheated gas stream then conducted into the cooling tower gas release system. The refrigeration effect of the cold acidic water vapor condensate, and the liquid sulfur dioxide by-product is utilized to provide subcooling for the auxiliary cooling water stream 23, the subcooled water stream 24 is used for cooling the compressed gas stream in after cooler 102. The temperature of the acidic water, and the liquid sulfur dioxide is normalized to near ambient temperature. The sulfur dioxide by-product is pumped through line 18 for transportation in pipe lines or bulk storage, and the acidic water is pumped through line 15 to a water treatment facility and recycled into the cooling tower system.

Figure 3:
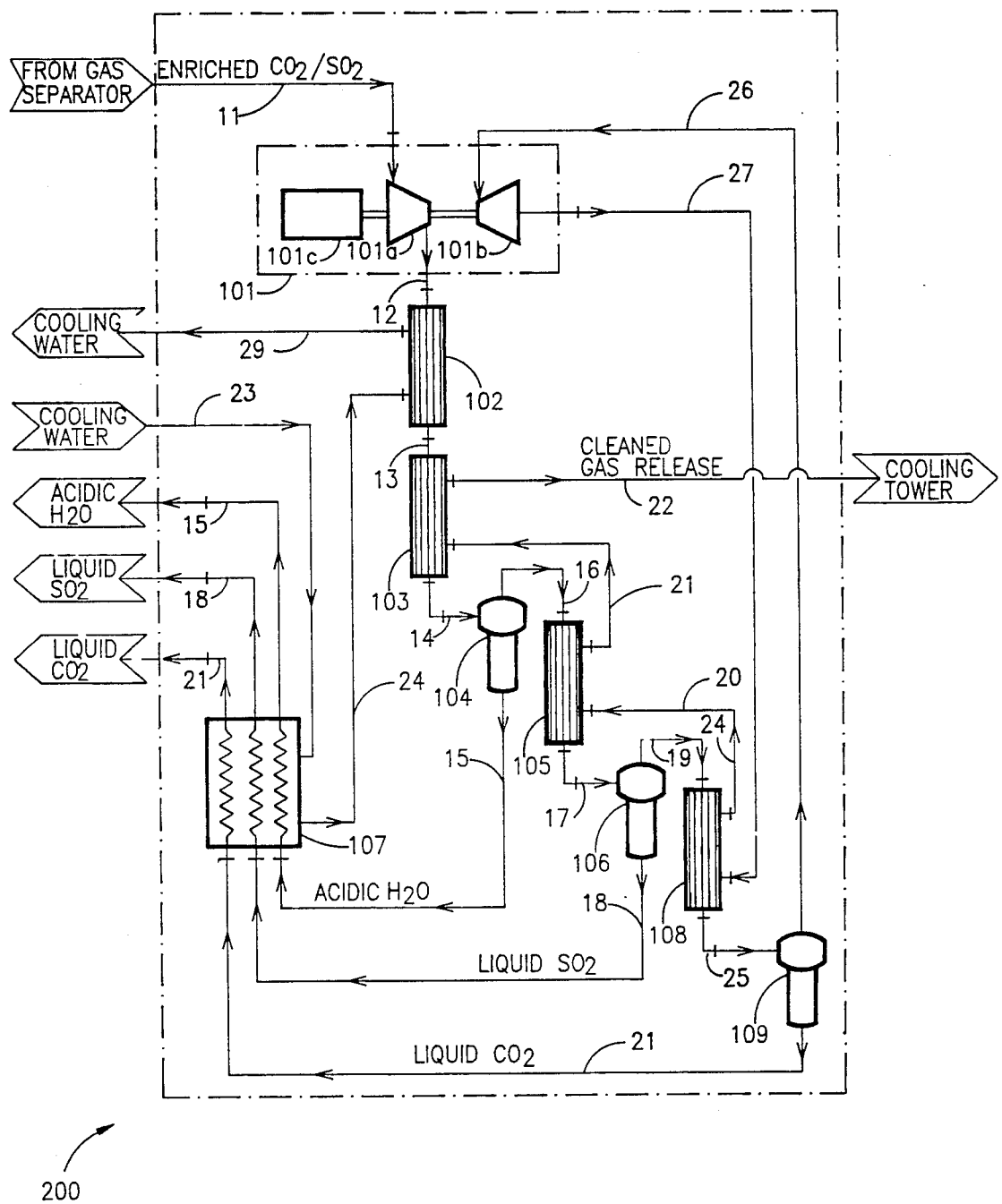
FIG. 3—Is a schematic diagram for a high pressure flue gas cleaning system by liquefaction of sulfur dioxide and carbon dioxide.

FIG. 3 indicates a schematic diagram for a similar system 200, where carbon dioxide emissions can be reduced by liquefaction. Unlike system 100, the gas compressor-expander unit 101 will have much higher pressure ratio of up to 20:1 with a range of 13:1 to 15:1 is preferred to generate the cryogenic effect required for the liquefaction of as desired part of the carbon dioxide contained in the heavier gas mixture. In addition to the heat exchange steps and embodiments indicated in system 100, a fourth heat exchanger 108 provides the cooling to the relatively high pressure gas stream to reach its equilibrium temperature of condensation. Moisture separator 109 separates the liquefied carbon dioxide from the uncondensed gas stream. At a system total pressure of above 210 psia, up to 50% of the carbon dioxide may be liquefied in heat exchanger 108 at a temperature below −60° F., most of the sulfur dioxide will be liquefied in heat exchanger 105 at a temperature below 0° F. and most of the acidic water vapor will condense in heat exchanger 103 at a temperature below 60° F. The refrigeration effect of the cold liquid carbon dioxide is utilized in the reversing heat exchanger 107 to provide the cooling needed for condensing the weak acidic water while restoring the temperature of the liquified carbon dioxide to near ambient temperatures before transferring into pipe lines or to a bulk storage facility.

The invented system shall effectively reduce the heat rate of the power plant heat cycle by employing the flue gas cooler to preheat the combustion air, and also will reduce the power needed to clean the flue gas by employing a gas compressor-expander open heat cycle system. It should be understood that the mass flow rates, operating pressures, and temperatures given are only to demonstrate the merits of the present invention, and the given values are based upon certain particulars which may vary. It is also understood that the quality of the by-products liquid sulfur dioxide, and liquid carbon dioxide shall be of commercial grade, processes for refining these products for food or medical grades are well known and are out of the scope of the present invention.

What is claimed is:

1. In combination with a fossil fueled power plant boiler system wherein the improvement allows cleanup of the flue gas stream by recovering thermal energy that otherwise would be lost to the atmosphere, and by employing a gas compressor-expander open heat cycle system, the improvement of which comprises:
   a thermal fossil fueled power plant boiler having a continuous combustion air stream and emitting a continuous flue gas stream containing particulate matter, hazardous volatile organic vapors, heavy metal vapors, acidic water vapors, nitric oxides, sulfur dioxide, carbon dioxide; conduits for conducting the said combustion air stream and the said flue gas stream;
   an electrostatic precipitator dust collection system to remove the said particulate matter;
   an electrostatic gas treater to neutralize the electromagnetic charges of the particulate matter released in the said flue gas stream flowing from the said electrostatic precipitator dust collection system;
   a condensing heat exchanger for recovering thermal energy from the flue gas stream to allow cooling and condensing water vapor contained therein while preheating combustion air stream;
   a gas seperator to seperate the flue gas stream flowing from the said condensing heat exchanger into a heavier flue gas fraction stream and a lighter flue gas fraction stream;
   a flue gas compressor-expander system consisting of a gas compressor, a gas expander, and a prime mover having a common drive shaft and drive controls to pressurize the said enriched carbon dioxide gas fraction and to expand the said pressurized gas stream into a reverse expanded gas stream;
   a heat exchanger to cool and condense part of the said acidic water vapors contained in the said pressurized enriched carbon dioxide gas fraction stream while heating an auxiliary cooling water stream;
   a first expanded reverse gas stream to a pressurized gas stream heat exchanger to further cool and condense the acidic water vapors contained in the pressurized flue gas stream while heating the expanded reverse gas stream flowing from a second reverse gas to gas heat exchanger;
   a first moisture separator to separate and remove the acidic water vapor condensate contained in the pressurized flue gas stream flowing from the said first reverse gas to gas heat exchanger;
   a second expanded reverse gas stream to a pressurized gas stream heat exchanger to further cool and condense most of the sulfur dioxide contained in the pressurized flue gas stream flowing from the first moisture separator while heating the expanded reverse gas stream flowing from a third reverse gas to has heat exchanger;
   a second moisture separator to separate and remove condensate of the liquefied sulfur dioxide gas contained in the said pressurized flue gas stream flowing from the said second gas to gas heat exchanger;
   a third expanded reverse gas stream to a pressurized gas stream heat exchanger to further cool and condense a part of the carbon dioxide contained in the pressurized flue gas stream flowing from the second moisture separator while further heating the expanded reverse gas stream flowing from the gas expander;
   a third moisture separator to separate and remove the condensate of the carbon dioxide gas contained in the pressurized flue gas stream flowing from the third reverse gas to gas heat exchanger;
   a liquid to liquid heat exchanger to allow normalizing the temperature of the said condensate products while chilling a cooling water stream;
   a water cooling tower flue gas diffusing system to allow further cleaning and releasing the lighter flue gas stream flowing from the said gas separator and the cleaned heavier flue gas stream flowing from the first reverse gas heat exchanger.

2. The combination of claim 1 wherein a gas compressor-expander open heat cycle employed to provide compression and cryogenic cooling to condense most of the said acidic water vapors, hazardous volatile organic vapors, heavy metals vapors, nitrogen oxides, sulfur dioxide and carbon dioxide gases contained in an enriched carbon dioxide gas fraction stream.

3. The combination of claim 1 wherein liquefied gas products are used to subcool and chill an auxiliary cooling water stream.

4. The combination of claim 1 wherein the flue gas are released into a recirculating cooling water tower structure to further oxidize and capture any trace hazardous vapors and gases that may escape the flue gas cleaning system, and to eject the cleaned flue gases into the atmosphere.

5. A process for cleaning a flue gas stream continuously emitting from a thermal power plant fossil fueled boiler and containing hazardous volatile organic vapors, heavy metal vapors, acidic water vapors, nitrogen oxides, sulfur dioxide, and carbon dioxide by cooling, and condensing processes employing a heat recovery condensing heat exchanging and a gas compressor-expander open heat cycle system; the improvement which comprises:
   cleaning the said flue gas stream by removing the particulate matter contained therein through an electrostatic precipitator dust collection system;
   neutralizing electromagnetic charges of the volatile organic and heavy metal vapors, and particulate matter released from the said electrostatic precipitator dust collection system;
   cooling the said flue gas stream to a lower near ambient temperature to effect condensation of water droplets that encapsulate fine particulates and fallout with said water droplets, and to accelerate oxidizing hazardous volatile organic vapors, heavy metal vapors, nitrogen oxides, and sulfur dioxide gases while recovering thermal energy to preheat a combustion air stream;
   separating the said cooled flue gas stream into a heavier gas stream enriched with carbon dioxide containing organic volatile vapors, trace heavy metal vapors, nitrogen oxides, and sulfur dioxide, and into a lighter gas stream enriched with nitrogen;

increasing the pressure of the said heavier gas stream and then;

cooling the said pressurized heavier gas stream to effect condensing most of the organic volatile and trace heavy metal vapors contained therein;

separating and removing the condensate of the said hazardous vapors;

further cooling the pressurized heavier gas stream to effect condensing most of the sulfur dioxide gas contained therein;

separating and removing the condensate of the said sulfur dioxide gas;

further cooling the desulfurized heavier gas fraction stream to effect condensing part of the carbon dioxide gas contained therein;

separating the condensate of the said carbon dioxide gas;

expanding the cleaned and cooled heavier gas fraction stream isentropically through a gas expander to produce auxiliary mechanical power and to substantially decrease the temperature of the said gas stream;

directing the said expanded gas stream to flow into a reverse direction;

exchanging thermal energy between the expanded reverse gas stream and the pressurized gas stream to effect cooling the pressurized gas stream wile heating and restoring the temperature of the expanded reverse gas stream;

releasing the already cleaned and heated reverse gas stream into the atmosphere through a cooling water tower flue gas released structure;

restoring the temperature of the said acidic water vapor condensate, liquefied sulfur dioxide, and liquefied carbon dioxide through a heat exchanger while chilling an auxiliary cooling water stream;

continuously removing the condensate of the said hazardous vapors condensate, and liquefied gas products for further treatment, and handling.

6. The process of claim 5 for removing volatile organic vapors and trace heavy metal vapors contained in a flue gas stream by employing a gas compressor-expander open heat cycle, and a gas cooling and condensing heat exchanging system, wherein the said heavier flue gas stream is subjected to an increase of its pressure to above 2:1 compression ratio, and a decrease of its temperature to below 85° F.

7. The process of claim 5 for removing acidic water vapors and nitrogen oxides contained in a flue gas stream by employing a gas compressor-expander open heat cycle, and a gas cooling and condensing heat exchanging system, wherein the said heavier flue gas stream is subjected to an increase of its pressure to above 2:1 compression ratio, and a decrease of its temperature to below 60° F.

8. The process of claim 5 for liquefying and removing sulfur dioxide contained in a flue gas stream by employing a gas compressor-expander open heat cycle, and a gas cooling and condensing heat exchanging system, wherein the said heavier flue gas stream is subjected to an increase of its pressure to above 2:1 compression ratio, and a decrease of its temperature to below −40° F.

9. The process of claim 5 for liquefying and removing carbon dioxide contained in a flue gas stream by employing a gas compressor-expander open heat cycle, and a gas cooling and condensing heat exchanging system, wherein the said heavier flue gas stream is subjected to an increase of its pressure to above 10:1 compression ratio, and a decrease of its temperature to below −60° F.

* * * * *